United States Patent
Stadelmeier et al.

(10) Patent No.: US 8,879,648 B2
(45) Date of Patent: Nov. 4, 2014

(54) TRANSMISSION AND RECEIVING APPARATUS AND METHOD IN A MULTI CARRIER TRANSMISSION SYSTEM

(75) Inventors: Lothar Stadelmeier, Stuttgart (DE); Lachlan Michael, Saitama (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 13/486,473

(22) Filed: Jun. 1, 2012

(65) Prior Publication Data

US 2012/0314790 A1 Dec. 13, 2012

(30) Foreign Application Priority Data

Jun. 10, 2011 (EP) .................................. 11169476

(51) Int. Cl.
| | | |
|---|---|---|
| *H04K 1/10* | (2006.01) | |
| *H04N 21/61* | (2011.01) | |
| *H04H 20/33* | (2008.01) | |
| *H04L 5/00* | (2006.01) | |
| *H04L 27/26* | (2006.01) | |
| *H04N 21/2383* | (2011.01) | |
| *H04N 21/438* | (2011.01) | |

(52) U.S. Cl.
CPC .......... *H04L 5/0092* (2013.01); *H04N 21/6118* (2013.01); *H04H 20/33* (2013.01); *H04L 5/0044* (2013.01); *H04L 5/0007* (2013.01); *H04L 27/2666* (2013.01); *H04N 21/2383* (2013.01); *H04L 27/2602* (2013.01); *H04N 21/4382* (2013.01)
USPC ........... 375/260; 375/267; 375/133; 375/130; 375/132; 370/329; 370/312; 370/208

(58) Field of Classification Search
USPC ........... 375/267, 295, 340; 370/329, 312, 208
See application file for complete search history.

(56) References Cited

U.S. PATENT DOCUMENTS

| | | | |
|---|---|---|---|
| 8,089,858 B2 | 1/2012 | Stadelmeier et al. | |
| 8,194,529 B2 | 6/2012 | Stadelmeier et al. | |
| 8,203,929 B2 | 6/2012 | Atungsiri et al. | |
| 8,665,926 B2 * | 3/2014 | Kawamura et al. | ........... 375/133 |
| 2007/0177494 A1 * | 8/2007 | Tomizawa | ..................... 370/208 |
| 2009/0296839 A1 | 12/2009 | Stadelmeier et al. | |

(Continued)

FOREIGN PATENT DOCUMENTS

| | | | |
|---|---|---|---|
| EP | 2 131 521 A1 | 12/2009 | |
| EP | 2 131 522 A1 | 12/2009 | |

OTHER PUBLICATIONS

Extended Search Report issued Feb. 6, 2014 in European Patent Application No. 12169090.3.

(Continued)

*Primary Examiner* — Eva Puente
(74) *Attorney, Agent, or Firm* — Oblon, Spivak, McClelland, Maier & Neustadt, L.L.P.

(57) ABSTRACT

A transmission apparatus and method for transmitting signals in a multi carrier transmission system comprises a modulator, a band information generator that generates band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel, and a transmitter.

20 Claims, 9 Drawing Sheets

(56) References Cited

U.S. PATENT DOCUMENTS

| | | | |
|---|---|---|---|
| 2009/0304023 A1 | 12/2009 | Stadelmeier et al. | |
| 2009/0304099 A1 | 12/2009 | Waller et al. | |
| 2010/0034219 A1 | 2/2010 | Stadelmeier et al. | |
| 2010/0085906 A1* | 4/2010 | Yamamoto | 370/312 |
| 2010/0195668 A1 | 8/2010 | Robert et al. | |
| 2011/0182380 A1 | 7/2011 | Muhammad et al. | |
| 2012/0113923 A1* | 5/2012 | Kashiwagi et al. | 370/329 |
| 2012/0113924 A1* | 5/2012 | Kashiwagi et al. | 370/329 |
| 2012/0147897 A1 | 6/2012 | Stadelmeier et al. | |

OTHER PUBLICATIONS

DVB Organization, "TM-C20310 C2 Rewording C2Only v1.docx" DVB Digital Video Broadcasting, XP017833817, May 25, 2011, 4 pages.

Robert J. et al., "DVB-C2—The standard for next generation digital cable transmission", Broadband Multimedia Systems and Broadcasting, IEEE, May 13, 2009, XP031480164, 5 pages.

DVB Organization, "DVB_TM_C2_314_20110624 C2 Delivery Descriptor Proposal. Docx", DVB Digital Video Broadcasting, Jul. 13, 2011, XP017835085, 2 pages.

U.S. Appl. No. 13/372,255, filed Feb. 13, 2012, Stadelmeier, et al.
U.S. Appl. No. 13/458,316, filed Apr. 27, 2012, Stadelmeier, et al.
U.S. Appl. No. 13/470,986, filed May 14, 2012, Atungsiri, et al.
U.S. Appl. No. 13/485,248, filed May 31, 2012, Stadelmeier, et al.

Digital Video Broadcasting (DVB), "Specification for Service Information (SI) in DVB systems", DVB Document A38, Jan. 2011, 157 pages.

Digital Video Broadcasting (DVB), "Implementation Guidelines for a second generation digital cable transmission system (DVB-C2)", DVB document A147, Nov. 2010, 165 pages.

ETSI, Digital Video Broadcasting (DVB), Frame structure channel coding and modulation for a second generation digital transmission system for cable systems (DVB-C2), ETSI EN 302 769 V1.1.1, Apr. 2010, 110 pages.

\* cited by examiner

| TS | TS₁ | TS₂ | TS₃ | TS₄ | ... |
|---|---|---|---|---|---|
| Channel Center Frequency | | | | | |
| Other data | | | | | |

FIG. 5

| PLP | PLP₁ | PLP₂ | PLP₃ | PLP₄ | ... |
|---|---|---|---|---|---|
| Center / Tuning Frequency | | | | | |
| Bandwidth / data slice id | | | | | |
| Receiver Parameters | | | | | |

FIG. 4

TRANSMISSION AND RECEIVING APPARATUS AND METHOD IN A MULTI CARRIER TRANSMISSION SYSTEM

CROSS-REFERENCE TO RELATED APPLICATION

The present application claims the benefit of the earlier filing date of EP 11169476.6 filed in the European Patent Office on Jun. 10, 2012, the entire content of which application is incorporated herein by reference.

BACKGROUND

1. Field of the Disclosure

The present disclosure relates to a transmission apparatus and a corresponding transmission method for transmitting signals in a multi carrier transmission system. Further, the present disclosure relates to a receiving apparatus and a corresponding receiving method for receiving signals in a multi carrier transmission system. Still further, the present disclosure relates to a multi carrier signal transmission system and a computer readable non-transitory medium.

2. Description of Related Art

Digital signals are transmitted in applications such as digital television broadcasting. Standards such as the so-called DVB standards have existed since the 1990s, and provide a range of different modulation schemes such as quadrature amplitude modulation (QAM) or orthogonal frequency division multiplex (OFDM) schemes for broadcast services, along with formats for the transmission of accompanying control data and metadata. These standards define both the radio frequency (RF) techniques used to carry the data and the way in which the data representing different broadcast services is organised into packets and streams for transmission.

The DVB standards are described extensively elsewhere, so only a brief summary will now be given, with reference to the standards relating to the transmission of broadcast cable services, although it will of course be appreciated that similar considerations can apply to (for example) digital satellite services and terrestrial broadcast services.

In basic terms, the video data, audio data and accompanying data corresponding to a broadcast programme are multiplexed into an MPEG-2 Programme Stream (PS). One or more PSs are multiplexed to form a transport stream (TS) formed as a sequence of fixed length data packets. The bit rate of the TS can range between about 6 Mbit/s and 84 Mbit/s depending on parameters such as the modulation scheme in use (16QAM to 4096QAM for example) and the bandwidth of the broadcast channel which will be used to carry the TS.

With current technology, one broadcast channel (with a bandwidth of a few MHz—up to 8 MHz) carries one TS. The TS includes packetised programme data (video, audio etc.) and packetised control data defining the different programmes carried by that TS (so called PSI/SI data). As elementary part of the PSI/SI data a so-called network information table (NIT) is also carried, which provides information about the physical network, such as channel frequencies, service originator and service name. Those details are particularly described in, Digital Video Broadcasting (DVB); Specification for Service Information (SI) in DVB systems—DVB Document A38, January 2011. Latest members of DVB's second generation physical standards such as DVB-C2 (as described in "Digital Video Broadcasting (DVB); Implementation Guidelines for a second generation digital cable transmission system (DVB-C2)—DVB document A147, November 2010") and DVB-T2 overcome the limit of mapping one TS to one physical layer by use of the so-called PLP (Physical Layer Pipe) approach, i.e. one physical layer signal typically contains more than one data stream (TSs).

EP 2131521 A1 and EP 2131522 A1 disclose a digital signal transmitter in which multiple data streams are each transmitted by modulation of a respective frequency band within one of a group of frequency channels, the frequency bands each occupying no more than a predetermined maximum bandwidth less than or equal to the channel width. The transmitter comprises means for transmitting at respective frequency positions within each frequency channel, one or more instances of band information defining the frequency bands corresponding to all of the data streams carried within that frequency channel, the one or more instances being arranged so that any portion of the frequency channel equal in extent to the predetermined maximum bandwidth includes at least one instance of the band information. Further, a corresponding digital signal receiver is disclosed.

There is a growing demand not only for more digital television services but also for higher quality (in terms of picture and audio resolution) services. This demand imposes pressure on the digital payload carried by each channel. It is a constant aim to use the available broadcast spectrum efficiently and flexibly.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object of the present disclosure to provide a transmission apparatus and a corresponding transmission method as well as a receiving apparatus and a corresponding receiving method that enable a receiver of a receiving apparatus to obtain the required information for tuning and to tune faster to a desired tuning frequency and that consume less storage space for signaling the required information enabling the receiver to tune to the desired tuning frequency, but still provide sufficient flexibility for signaling different situations.

According to an aspect of the present disclosure there is provided a transmission apparatus for transmitting signals in a multi carrier transmission system comprising:
  a modulator that modulates each of multiple data streams onto frequency subcarriers of a respective frequency band within one of a group of one or more frequency channels, the frequency bands each occupying no more than a predetermined maximum bandwidth less than or equal to the channel width,
  a band information generator that generates band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel,
  a transmitter that transmits said data streams modulated onto frequency subcarriers and one or more instances of said band information at respective frequency positions within each frequency channel.

According to another aspect of the present disclosure there is provided a corresponding receiving apparatus for receiving signals in a multi carrier transmission system, wherein each of multiple data streams are modulated onto frequency subcarriers of a respective frequency band within one of a group of one or more frequency channels, the frequency bands each occupying no more than a predetermined maximum bandwidth less than or equal to the channel width, said receiving apparatus comprising:

a receiver that aligns its receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel, and a band information reader that reads said band information and retrieves the frequency band tuning frequency of a desired frequency band by evaluating said tuning frequency type indicator and the corresponding tuning frequency indicator, wherein said receiver is configured to tune to the tuning frequency indicated by the read tuning frequency indicator if the tuning frequency type indicator indicates a first type of the tuning frequency or to use additional tuning information for tuning if the tuning frequency type indicator indicates a second type of the tuning frequency.

These aspects of the present disclosure are based on the idea to reduce the signaling overhead and enabling a faster tuning of the receiver by use of a tuning frequency type indicator which indicates to the receiver what type of tuning frequency is indicated by the tuning frequency indicator. Hence, the tuning frequency indicator can be flexibly used, i.e. different tuning frequencies can be recorded in this tuning frequency indicator (which can also be regarded as one of a number of descriptors), and only a short tuning frequency type indicator is required to convey the information to the receiver which tuning frequency the receiver actually reads from said tuning frequency indicator.

According to another aspect of the present disclosure there is provided a transmission apparatus for transmitting signals in a multi carrier transmission system comprising:

a modulator that modulates each of multiple data streams onto frequency subcarriers of a respective frequency band within one of a group of one or more frequency channels, the frequency bands each occupying no more than a predetermined maximum bandwidth less than or equal to the channel width, a band information generator that generates band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, a transmitter that transmits said data streams modulated onto frequency subcarriers, one or more instances of said band information at respective frequency positions within each frequency channel and said additional tuning information.

According to still another aspect of the present disclosure there is provided a corresponding receiving apparatus for receiving signals in a multi carrier transmission system, wherein each of multiple data streams are modulated onto frequency subcarriers of a respective frequency band within one of a group of one or more frequency channels, the frequency bands each occupying no more than a predetermined maximum bandwidth less than or equal to the channel width, said receiving apparatus comprising:

a receiver that aligns its receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, and a band information reader that reads said band information and retrieves the frequency band tuning frequency of a desired frequency band by evaluating said tuning frequency use flag and the corresponding tuning frequency indicator and that reads further signaling data, in particular L1 signaling data, including additional tuning information in case the tuning frequency use flag is set to said second flag value, wherein said receiver is configured to tune to the tuning frequency indicated by the read tuning frequency indicator of the desired frequency band if the tuning frequency use flag is set to said first flag value or use said additional tuning information for tuning if the tuning frequency use flag is set to said second flag value.

These aspects of the present disclosure are based on the idea to reduce the signaling overhead and enabling a faster tuning of the receiver by use of a tuning frequency use flag which indicates to the receiver if a tuning frequency indicated by the tuning frequency indicator can be used directly by a receiver or if additional tuning information, e.g. stored in further signaling data (for instance, as stored in the L1 signaling) is needed. Hence, the tuning frequency indicator can be flexibly used, i.e. different tuning frequencies can be recorded in this tuning frequency indicator (which can also be regarded as one of a number of descriptors), and only a short flag is required to convey the information to the receiver if it can directly tune to this tuning frequency or if additional tuning information is needed.

All aspects of the present disclosure are thus to a common inventive concept of using the tuning frequency indicator flexibly, rather than storing a fixed type of information therein, and using additional descriptor elements, i.e. the tuning frequency type indicator or the tuning frequency use flag to convey information to the receiver about the type or required use of the tuning frequency stored in this tuning frequency indicator.

According to a still further aspect a computer readable non-transitory medium having instructions stored thereon which, when carried out on a computer, cause the computer to perform the steps of the transmission method and receiving method, respectively, according to the present disclosure are provided.

Preferred embodiments are defined in the dependent claims. It shall be understood that the claimed apparatus, methods, computer program and computer readable medium have similar and/or identical preferred embodiments as the defined in the dependent claims and as described herein.

The present disclosure relates to a suitable signaling mechanism that may preferably be used within the MPEG2-TS for second generation DVB systems, especially for DVB-C2 systems with their specific framing structure. Of course, this signaling mechanism may also be used to advantage in other transmission systems using other framing structures or other mappings of data streams onto the frequency channels. In such a framing structure one or more transport streams are mapped onto one or more data slices (herein also referred to generally as frequency bands) each (in case of more than one data slice) covering only a portion of the total bandwidth of the frequency channel. In embodiments of such known systems band information is also called delivery system descriptor.

In an embodiment the present disclosure is used in a transmission system, e.g. a cable TV broadcast system or VoD (Video on Demand) system, for transmission of said band information via a separate wired or wireless communication channel, in particular via an electrical and/or optical cable channel.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 schematically illustrates an L1 data packet;

FIG. 5 schematically illustrates a network information table;

DESCRIPTION OF THE EMBODIMENTS

Figure 1:
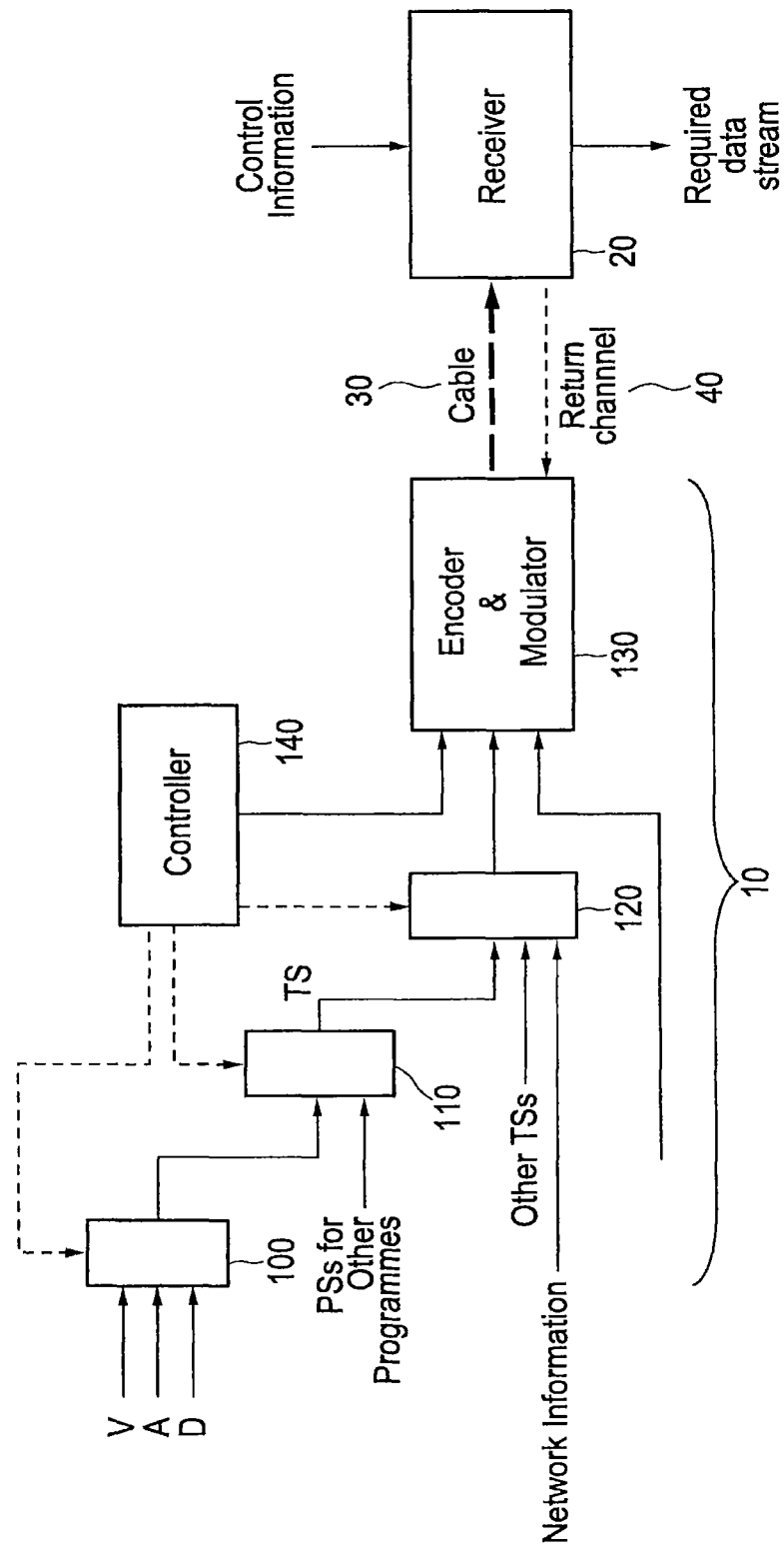
FIG. 1 schematically illustrates a digital signal transmission system.

Referring now to the drawings, wherein like reference numerals designate identical or corresponding parts throughout the several views, FIG. 1 shows a digital signal transmission system comprises a transmission apparatus 10 and a receiving apparatus 20, linked by a transmission link 30. In this example, the transmission link is a wired link (which term encompasses electrically conductive wires and optical fibers), and the system of FIG. 1 is arranged to provide a cable television service. In general terms, except where differences are described, the apparatus operates in accordance with the DVB-C2 standard which shall be referred to here as an exemplary embodiment.

An optional return channel 40, by which data such as purchasing data or viewing statistics can be carried from the receiving apparatus to the transmission apparatus, is also provided. The return channel is conventional and will not be described further here.

The present techniques are not limited to cable systems. Corresponding techniques may be used in other transmission systems such as terrestrial or satellite systems.

The transmission apparatus comprises a number of programme multiplexers 100, one for each programme data stream to be transmitted. These multiplex video, audio and data streams relating to a programme into an MPEG-2 programme stream (PS). The PS is multiplexed by a transport multiplexer 110 with PSs for other programmes to form an MPEG-2 transport stream (TS). A TS is a basic digital stream carried by the system, and can have a bitrate generally in the range of about 6 to about 84 Mbit/s.

The TS is multiplexed with other TSs (or other input streams such as so-called Generic Encapsulated Streams, Generic Continuous Streams or Generic Fixed-Length Packetised Streams) and also network information (to be described later) by a multiplexer 120, with the resulting data being passed to an encoder and modulator 130.

The encoder and modulator 130 encompasses such functions as packetising, channel coding, data interleaving (by time and/or frequency), word length conversion, differential coding, QAM coding, frame generation, base-band filtering and radio frequency (RF) modulation such as OFDM modulation in which each payload stream is carried by modulated groups of (generally) adjacent sub-carriers. Except where described, these functions correspond to known functions of a DVB-C2 transmission apparatus. In a practical system there may well be multiple transmission apparatus coupled to a combiner to generate a combined modulated RF signal. The modulated RF signal is passed to the cable 30 for transmission to one or more (and generally a large number of) receiving apparatus 20.

The transmission apparatus 10 operates under the control of a controller 140. The functions carried out by the controller 140 (e.g. preparation of NIT and band information data) will be described below. The receiving apparatus 20 will be described in more detail below, particularly with reference to FIG. 7. For now, it is sufficient to note that the receiving apparatus operates in accordance with control information to demodulate and decode a required data stream—for example, a particular TS—from the transmitted signal.

In operation, the transmission apparatus 10 operates at a number of frequency channels. These lie generally within the range of about 47 to about 862 MHz. But the present techniques could apply to an arrangement having only one frequency channel. Within each channel, data are transmitted by OFDM modulation of multiple sub-carriers.

Figure 2:
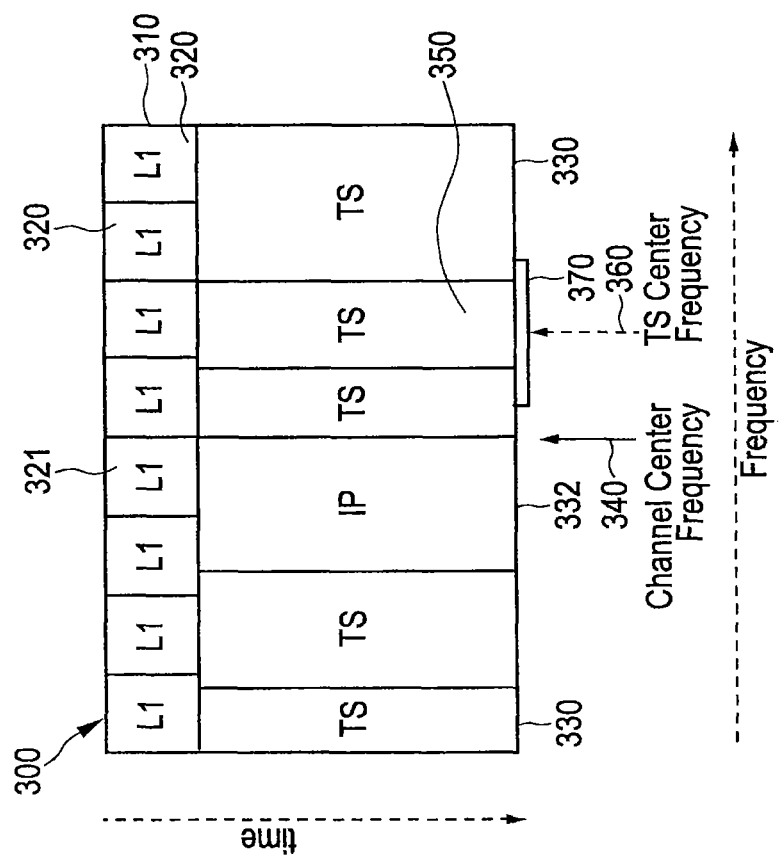
FIG. 2 schematically illustrates a first embodiment of a data transmission frame as used according to the present disclosure.

While in previous systems the channels had a fixed width, for example 8 MHz, with each channel being adjacent in frequency (with a small guard band) to the next channel, in newer systems channels of different widths (arbitrary widths above 7.61 MHz, e.g. 8, 16 or 32 MHz) are allowed to be used. However, the receiver bandwidth (and, correspondingly, the maximum allowed bandwidth by which a single payload data stream such as a TS can be carried) remains the same as with the previous systems, e.g. 8 MHz. In other words, the predetermined receiver bandwidth is less than or equal to the channel width. The techniques also allow multiple TSs or other types of payload to be carried within a single channel. FIG. 2, illustrating a previously proposed data transmission frame will be used to explain how this technique operates.

Once again, time is represented in a downward vertical direction and frequency in a horizontal direction. A data frame 300 is (in this example) 32 MHz wide and starts with preamble data 310. In the preamble 310 multiple instances 320 of L1 data are included at different frequency positions within the channel. The particular contents of the L1 data will be explained below, but with reference to the example of FIG. 2 it should be noted that as an example eight such instances are provided within a 32 MHz channel. In other words, each instance of the L1 data is provided by a group of adjacent OFDM subcarriers which, taken as a group, occupy a bandwidth of 4 MHz of (in other systems of 7.61 MHz, equivalent to maximum data slice bandwidth), though more generally each instance could be less than the receiver bandwidth, and there could be a correspondingly higher number of instances if the bandwidth of each instance was lower. In other embodiments, the instances of the L1 data could also occupy a larger bandwidth, even a bandwidth above 8 MHz.

The eight instances of the L1 data (in this example) within a single 32 MHz channel are preferably identical and, for convenience, are preferably transmitted at the same time. The reason that the L1 data is transmitted in a bandwidth no greater than the receiver bandwidth is that wherever the 8 MHz receiver bandwidth is aligned within the 32 MHz channel, the receiver bandwidth is bound to encompass at least one complete instance of the L1 data.

Figure 3:
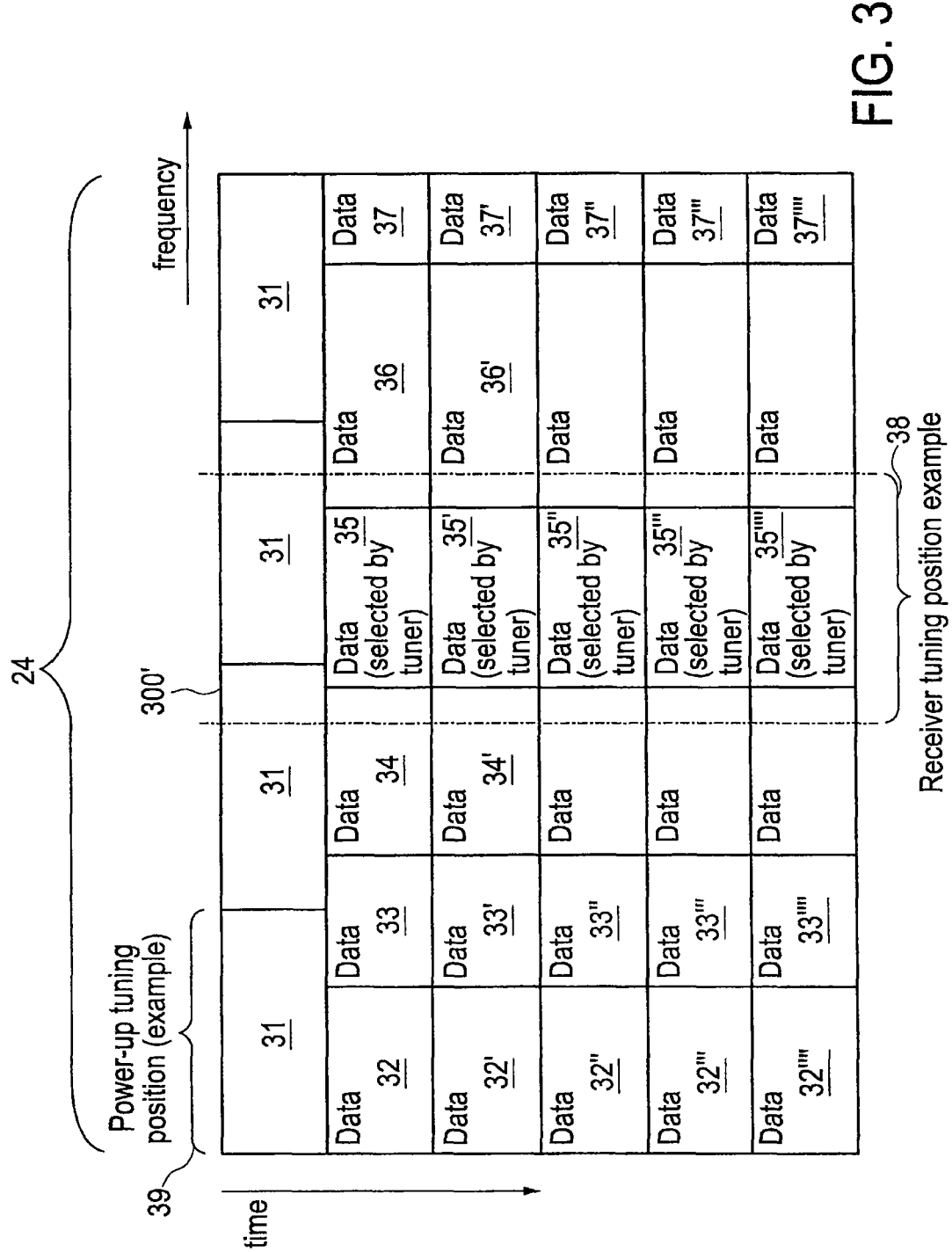
FIG. 3 schematically illustrates a second embodiment of a data transmission frame as used according to the present disclosure.

FIG. 3 shows a schematic example of a time frequency domain representation of a frame structure or pattern 300' as used according to the DVB-C2 standard in which the present disclosure may be used. The frame structure 300' covers the entire transmission bandwidth 24 in the frequency direction and comprises at least one (or at least two, or at least three, etc.) signaling patterns 31 (which correspond to the instances of L1 data mentioned above) adjacent to each other in the frequency direction, each carrying the identical or almost identical signaling data mapped on respective frequency carriers and having the same length. In the example shown in FIG. 3, the first time slot of the entire transmission bandwidth 24 is sub-divided into four signaling patterns 31, but any other higher or lower number of signaling patterns might be suitable.

The length of the pilot bands (number of frequency carriers allocated to a pilot band) is advantageously the same for each signaling pattern. The length or bandwidth 39 of every signaling pattern 31 may be the same as the bandwidth 38 to which the tuner of the receiving apparatus can be tuned. However, the part of the transmission bandwidth to which the tuner of the receiving apparatus can be tuned, may be larger than the length of a signaling pattern 31. The mapping of the signaling data and pilot signals onto frequency carriers is performed by a frequency to time transformation means during the transformation from the frequency to the time domain.

Each signaling pattern 31 comprises for example the location of the signaling pattern 31 within the frame. For example each signaling pattern 31 in each frame 300' has and carries the identical signaling data. The signaling data are for example L1 signaling data which contain all physical layer information that is needed by the receiving apparatus to decode received signals. However, any other suitable signaling data may be comprised in the signaling patterns 31. The signaling patterns 31 might for example comprise the location of the respective data segments 32, 33, 34, 35, 36 so that a receiving apparatus knows where the wanted data segments are located so that the tuner of the receiving apparatus can tune to the respective location in order to receive the wanted data segments. Alternatively, as stated above, each signaling pattern of a frame might comprise the identical signaling data, and the location of the respective signaling pattern within a frame is signaled in a different way, e.g. by means of the pilot signal sequence of the signaling patterns or by means of information encoded in guard bands or the like. As stated above, each of the signaling patterns 31 could comprise information about each of the data patterns comprised in a frame. This information could include the data pattern length, the number and/or the location of the pilot signals comprised in the data patterns and/or the tuning position (e.g. center of the tuning bandwidth, start of the tuning bandwidth or the like) and/or any other suitable information. Hereby, the information on the length of the data patterns is e.g. expressed in terms of or referring to the minimum data pattern lengths. However, in order to reduce the overhead, each signaling pattern 31 could comprise information about only a part or some of the data patterns, for example but not limited to the ones which are located within (or located within and adjacent to) the frequency band in which the signaling pattern 31 is located. In the example of FIG. 3, the first signaling pattern 31 in the frame could comprise information about the data patterns 32 and 33 (and the time wise following data patterns 32', 32" ... 33', 33" etc). The second signaling pattern in the frame could comprise information about the data patterns 33, 34 and 35 (and the time wise following data patterns 33', 33" ... 34', 34" ... 35', 35" etc).

As mentioned above, the first signaling patterns 31 could also comprise the tuning position, i.e. the frequency band to which a receiver such as the receiving apparatus 63 shall be tuned in order to receive the corresponding data patterns. This tuning position could for example be signaled as the center of the tuning bandwidth, the start of the tuning bandwidth or any other suitable frequency position. This has the advantage that the length (in the frequency direction) of the data patterns could be varied from frame to frame within the current tuning bandwidth without the need or necessity to tune the receiving apparatus from frame to frame. In other words by signaling the tuning position in the first signaling patterns 31, a receiving apparatus could easily cope with data patterns of a various lengths within the current tuning bandwidth. Further, such an implementation would have the advantage that it would not be necessary to provide guard bands (in the frequency domain) between adjacent transmission channel bandwidths. Each transmission channel bandwidth (each transmission channel bandwidth for example is a multiple of the tuning bandwidth) comprises signaling patterns, wherein each of the signaling patterns for example has the identical (or almost identical) signaling data. The signaling data in first signaling patterns 31 of neighboring transmission channel bandwidths, however, could be different. Hereby, by having information on the beginning of the tuning bandwidth for each respective receiver comprised in the signaling data of the first signaling patterns 31 a clear and unambiguous allocation of the first signaling data to a respective receiver could be achieved and therefore the guard bands between adjacent transmission channel bandwidths would not be necessary any longer. Further, by signaling the tuning position it can be avoided that a receiver is tuned to a position in which a part of a first kind of signaling patterns and a part of a second kind of signaling patterns are received within the tuning bandwidth, whereby the parts could not be re-ordered or re-combined since they contain different signaling content. A further possibility is to additionally include information in the signaling data of the first signaling patterns 31 if a notch is present in the following data pattern. In an advantageous embodiment, the notch always has the length of a minimum data pattern or a multiple thereof. In this case, a notch can always be treated as a data pattern from a logical point of view. Including information about the positions of notches in the signaling data has the further advantage that the receiver automatically knows that e.g. continual pilot signals are present at the borders of the notch in the neighboring data patterns, by which the data capacity of these data patterns is reduced.

Thus, as shown in FIG. 3, each frame preferably comprises at least two instances of L1 data (also called signaling patterns) adjacent to each other in the frequency direction and at least two data patterns (blocks of data mapped on different frequency bands) following the at least two signaling patterns in the time direction in the time slot immediately succeeding the time slot in which the at least two signaling patterns are located. Each of the data patterns succeeding the signaling patterns is respectively followed by further data patterns in succeeding time slots in the time direction, wherein all data patterns following each other in the time direction have the same frequency direction structure, each of the at least two signaling patterns and the data patterns comprising a plurality of frequency carriers. Such a frame structure as well as the forming and use of such a frame are also described in more detail in the above cited DVB-C2 standard and in multiple patent applications of the same applicant, e.g. in US 2010/0034219 A1 which descriptions are herewith incorporated by reference herein.

The multiple instances of the L1 data need not (when considered together) fill the whole channel width. There could be frequency gaps or guard bands between them. As before, there are two routes to the receiver locating a channel. One is via a NIT (Network Information Table), and the other is through a frequency sweep as described above.

The NIT in this embodiment defines the center frequency for each channel rather than defining frequency ranges for individual TSs within that channel. Each TS carried by a channel is described by the center frequency of the channel, rather than by the center frequency of the frequency band carrying the data stream representing that TS. Conventionally, e.g. as described in EP 2131521 A1, in order to find the center frequency of the frequency band for the relevant TS, the receiving apparatus first aligns its receiver bandwidth with the center frequency 340 of the channel, then detects the next available instance of the L1 data (which in this case would be the next available transmission of either the instance 321), then detects from the received L1 data the center frequency and other receiver parameters (e.g. QAM parameters, identity of the subcarrier streams, bandwidth etc) of the required TS. For example, if the required TS for a particular PS is the TS 350, the L1 data for that PS would specify at least (a) the TS; (b) the TS center frequency 360; and (c) receiver parameters for the TS. Knowing the center frequency and bandwidth, the receiving apparatus would align its receiver bandwidth 370 to ensure that it encompasses the band occupied by that TS.

If the required channel is located by a frequency sweep, then the mechanism for locating a TS is similar, in that the receiving apparatus aligns its bandwidth with any position within the channel and detects an instance of the L1 data. From this, the receiver can extract all of the information needed to receive the required TS, in the same way as just described.

The payload data 330 follows the L1 data in time direction. Multiple TSs can be carried by a single channel or even by a single frequency band, along with other types of data such as IP data 332—an example of the more general data type known as "generic stream encapsulation" or GSE.

FIG. 4 schematically illustrates an instance of the L1 data. The L1 data is mainly responsible for signaling for the C2 signal and all PLPs all physical layer related parameters, but here the specific functions to be described are that for each PLP (Physical Layer Pipe) (e.g. the PLPs: PLP1.4), the L1 data defines: the center (or tuning) frequency of each PLP; the bandwidth and data slice id of the PLP; and receiver parameters for that PLP.

FIG. 5 schematically illustrates a network information table (NIT). The NIT is transmitted as a data stream with a unique programme identifier PID. If it is trans-mitted at least once in each TS, it can therefore be extracted by reference to that PID. It is considered optional and proprietary in the context of the DVB-C2 standards, and as such can contain various types of data. But amongst such other possible functions, in the present context the NIT serves to identify the channel center frequency (and, optionally, other parameter data) for each TS.

Figure 6:
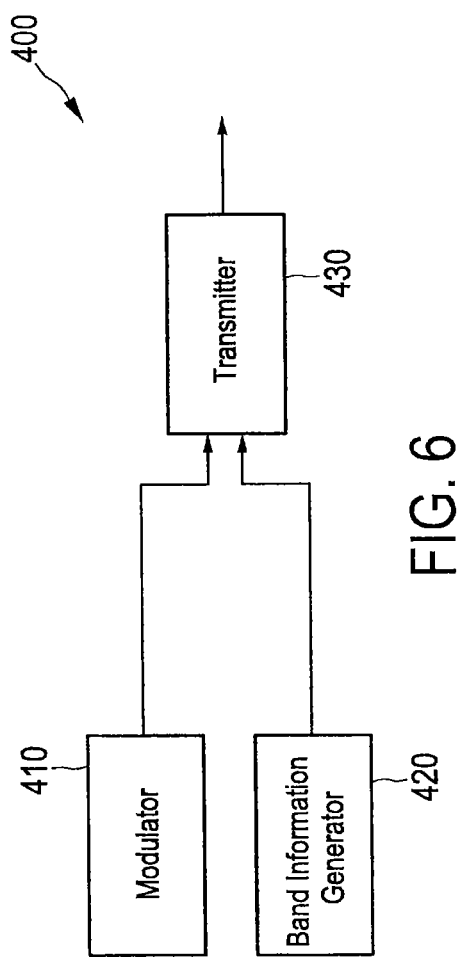
FIG. 6 schematically illustrates a transmission apparatus according to the present disclosure.

An embodiment of a transmission apparatus 400 according to the present disclosure is schematically depicted in FIG. 6. It comprises a modulator 410 that modulates each of multiple data streams onto frequency subcarriers of a respective frequency band within one of a group of one or more frequency channels, the frequency bands each occupying no more than a predetermined maximum bandwidth less than or equal to the channel width. Further, the transmission apparatus 400 comprises a band information generator 420 that generates band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel. Still further, the transmission apparatus 400 comprises a transmitter 430 that transmits said data streams modulated onto frequency subcarriers and one or more instances of said band information at respective frequency positions within each frequency channel.

Figure 7:
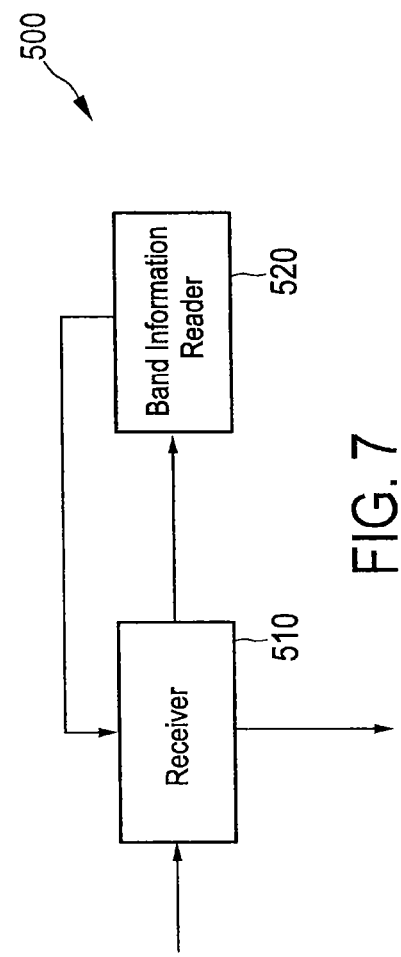
FIG. 7 schematically illustrates a receiving apparatus according to the present disclosure.

An embodiment of a receiving apparatus 500 according to the present disclosure is schematically depicted in FIG. 7. It comprises a receiver 510 that aligns its receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel. Further, the receiving apparatus 500 comprises a band information reader 520 that reads said band information and retrieves the frequency band tuning frequency of a desired frequency band by evaluating said tuning frequency type indicator and the corresponding tuning frequency indicator. The receiver 510 is configured to tune to the tuning frequency indicated by the read tuning frequency indicator if the tuning frequency type indicator indicates a second type of the tuning frequency or to use additional tuning information for tuning if the tuning frequency type indicator indicates a first type of the tuning frequency.

Figure 8:
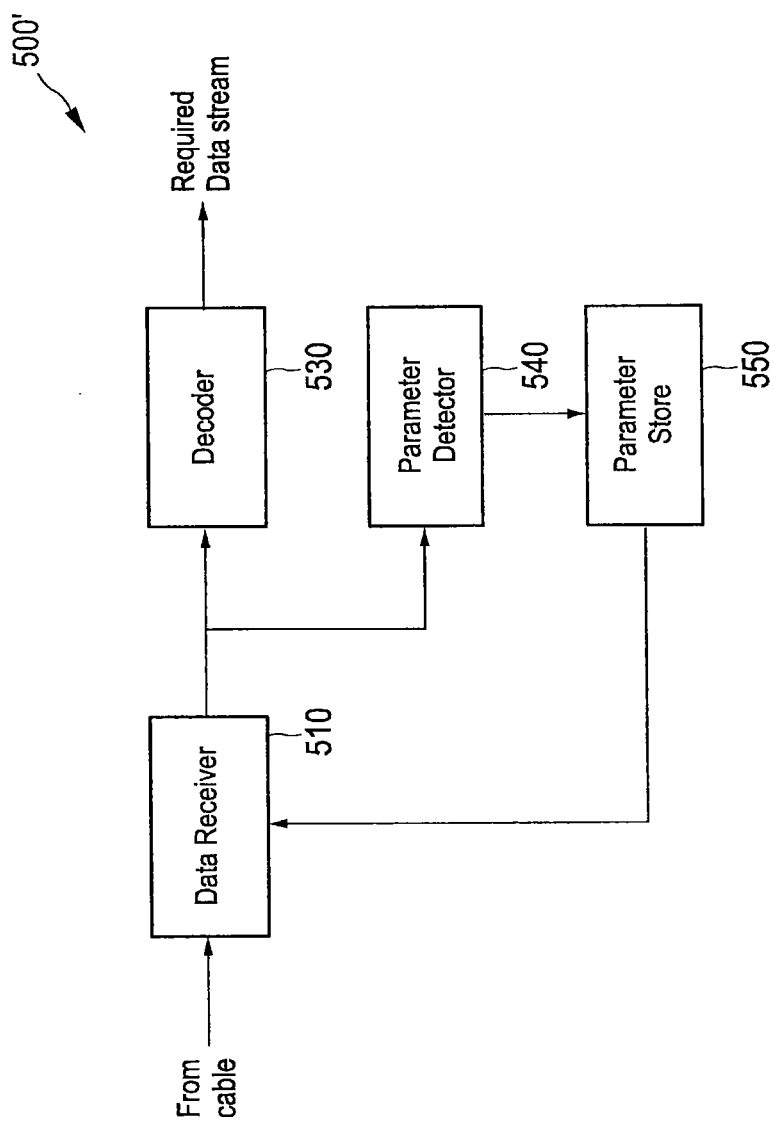
FIG. 8 schematically illustrates another embodiment of a receiving apparatus according to the present disclosure.

FIG. 8 schematically illustrates a more detailed embodiment of a receiving apparatus 500'. The incoming cable signal is supplied to a data receiver 510 which comprises a tuner (having in this example an 8 MHz bandwidth, though this may be adjustable as described below), a QAM demodulator and a channel decoder, which carries out such known operations as differential decoding, word length conversion, deinterleaving and the like to generate output data. The data signal output by the data receiver 510 is passed to a decoder 530 and a parameter detector 540 associated with a parameter store 550.

Figure 9:
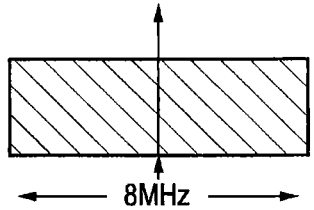
FIGS. 9 to 11 show diagrams illustrating different tuning situations covered by the present disclosure.

The parameter detector 540 carries out the functions of detecting channel details from the NIT or from the sweep and detecting TS details from the L1 data and thus preferably includes the band information reader 520 shown in the more general block diagram of FIG. 9. All of these details are stored in the parameter store 550 and used to control the data receiver 510. The decoder 530 operates to decode the required PS stream once the appropriate receiver parameters have been set.

The data receiver 510 may have a variable bandwidth, within certain limits. For example, the data receiver 510 may have a bandwidth that is selectable between 8 MHz and 7 MHz—possibly to allow for legacy compatibility with different instances of previous DVB-C systems. Such a feature can in fact be used in connection with the present techniques, so that once the L1 data has defined parameters to receive the required data stream, the data receiver can set its receiver bandwidth to the lowest (or simply a low) setting (from amongst those values available to the data receiver) which still encompasses the required data stream, allowing of course for so-called roll-off which is a lessening of the data receiver's response at the edges of the data receiver's bandwidth. Where such a feature is used, the data receiver can for example set its bandwidth back to a higher level (if that is indeed necessary given the width of each instance of the L1 data) whenever the L1 data specifically needs to be accessed.

A first embodiment of the present disclosure shall now be explained in more detail. The band information is, in this embodiment, included in a so called delivery system descriptor as shown below in table 1. This delivery system descriptor is used in the TS loop of the Network Information Table to describe DVB-C2 transmissions. This descriptor maps Transport Streams to data PLPs in Data Slices (herein also referred to as frequency bands) of C2 systems. The number of delivery system descriptors (also called C2_delivery_system_descriptor for the following examples) per NIT is preferably equal to the number of Transport Streams in the network carried over DVB-C2.

TABLE 1

| delivery system descriptor | | |
|---|---|---|
| Syntax | Number of bits | Identifier |
| C2_delivery_system_descriptor( ) { | | |
|   descriptor_tag | 8 | uimsbf |
|   descriptor_length | 8 | uimsbf |
|   descriptor_tag_extension | 8 | uimsbf |
|   plp_id | 8 | uimsbf |
|   data_slice_id | 8 | uimsbf |
|   C2_tuning_frequency | 32 | bslbf |
|   C2_tuning_frequency_type | 2 | uimsbf |

TABLE 1-continued

| delivery system descriptor | | |
|---|---|---|
| Syntax | Number of bits | Identifier |
|   active_OFDM_symbol_duration | 3 | bslbf |
|   guard_interval | 3 | bslbf |
| } | | |

The semantics for the delivery system descriptor are as follows (some are also explained in ETSI EN 302 769: "Digital Video Broadcasting (DVB); Frame structure channel coding and modulation for a second generation digital transmission system for cable systems (DVB-C2)") and in "Digital Video Broadcasting (DVB); Specification for Service Information (SI) in DVB systems, DVB document A38, January 2011":

plp_id: This 8-bit field uniquely identifies a data PLP within the C2 System.

data_slice_id: This 8-bit field uniquely identifies a data slice within the C2 system.

C2_tuning_frequency: This 32-bit field indicates the frequency value in steps of 1 Hz that the receiver should tune to. The coding range is from minimum 0x00000001 (1 Hz) up to a maximum of 0xFFFFFFFF (4 294 967 295 Hz). This tuning frequency follows the syntax described in the C2_tuning_frequency_type field.

C2_tuning_frequency_type: This 2-bit field indicates the tuning frequency type as shown in table 2 below. This differentiation addresses all specifics of the C2 transmit signal and the underlying Data Slice structure. At least two different types (indicated by types "00" and "01") are generally distinguished.

TABLE 2

| C2_tuning frequency type | |
|---|---|
| C2_tuning_frequency type | Description |
| 00 | Data Slice tuning frequency |
| 01 | C2 system center frequency |
| 10 | Initial tuning position for a (Dependent) Static Data Slice |
| 11 | reserved for future use |

The Data Slice tuning frequency is the default option for C2 systems. The C2_tuning_frequency field conveys the tuning frequency of the data slice to which plp_id refers. The C2_tuning_frequency for a particular Data Slice is the sum of the L1 signaling parameters START_FREQUENCY and the DSLICE_TUNE_POS. Note that the Data Slice tuning frequency information in the L1 signaling as well as in the C2 delivery system descriptor has to be updated synchronously.

The C2_System center frequency is used by C2 headends (transmitters) that are not able to update the Data Slice tuning frequency information in the C2 delivery system descriptor and the L1 signaling in a synchronous way. The C2_tuning_frequency is the center frequency of the C2 system, and it is required that a complete preamble can be received. The receiver needs to evaluate the L1 signaling in the preamble to get knowledge of the final tuning position.

Signaling of the Initial tuning position for Static Data Slice (sometimes also referred to as Dependent Data Slice) implies that the Data Slice to be demodulated is a (Dependent) Static Slice (as e.g. described in as described in "Digital Video Broadcasting (DVB); Implementation Guidelines for a second generation digital cable transmission system (DVB- C2)—DVB document A147, November 2010"). In the case of tuning to a Dependent Static Data Slice, it cannot be guaranteed that the receiver is able to decode the L1 signaling at its final tuning position. Therefore the receiver must first tune to the signaled initial C2_tuning_frequency where a complete Preamble is transmitted. This frequency will usually be the C2_System center frequency, but can be any tuning position where the receiver can reliably decode the L1 signal. The receiver needs to evaluate the L1 signaling in the preamble in order to determine additional parameters (particularly notch positions) as well as the final tuning frequency of the Dependent Static Data Slice.

Active OFDM symbol duration: This 3 bit field indicates the duration of the active OFDM symbol according to table 3 below.

TABLE 3

Signaling format for the active OFDM symbol duration

| active_OFDM_symbol_duration | Description |
| --- | --- |
| 000 | 448 μs (4k FFT mode for 8 MHz CATV systems) |
| 001 | 597,33 μs (4k FFT mode for 6 MHz CATV systems) |
| 010 to 111 | reserved for future use | guard_interval: This 3-bit field indicates the guard interval according to table 3 below.

TABLE 4

Signaling format for the guard interval

| guard_interval | Guard interval values |
| --- | --- |
| 000 | 1/128 |
| 001 | 1/64 |
| 010 to 111 | reserved for future use |

In the following several different implementations of the above described embodiment in a transmission system according to the present disclosure shall be briefly discussed. In an 8 MHz only transmission system the C2_System center frequency (C2SF) and Data Slice tuning frequency (DSTF) are equivalent as depicted in FIG. 9. They are not dependent on the number or position of data slices and only need one frequency needs to be signaled (not both). Preferably DSTF is signaled, and the C2_tuning_frequency_type is set to "00".

Figure 10:
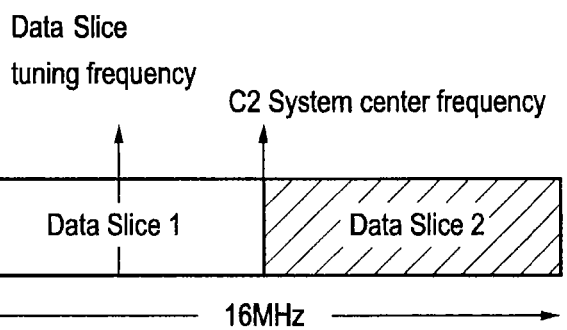

In a transmission system having a bandwidth larger than 8 MHz the C2SF is usually at the center of the band and is different from the DSTF as depicted in FIG. 10. The Data slice tuning frequency (DSTF) is also different dependent on whether data slice 1 or data slice 2 is wanted. Generally, either C2SF or DSTF could be signaled. Signaling the DSTF is useful to reduce the time to demodulate the data slice 1 or 2 since the receiver can go directly to the data slice without needing a 2-step tuning process. In this case the C2_tuning_frequency_type is set to "00".

Sometimes, however, headends cannot update L1 signaling and the delivery system descriptor in a synchronous way, e.g. in case of low cost headends or C2 signals with dynamic data. Then, the Data Slice tuning frequency cannot be signaled accurately, so the C2SF should be signaled instead. In this case the C2_tuning_frequency_type is set to "01".

Figure 11:
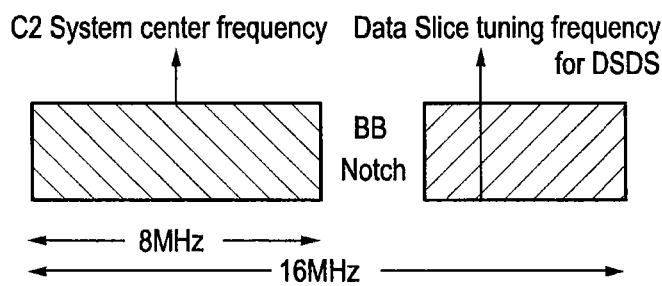

In a transmission system having (dependent) static data slices (DSDS) the C2 System center frequency (C2SF) is usually at the center of the 8 MHz (or greater) band as depicted in FIG. 11. The data slice tuning frequency (DSTF) for the dependent static data slice is about 4 MHz from the edge of the bandwidth. In this case the receiver first decodes the C2 System center frequency to decode all L1 signaling parameters before tuning to the Data Slice tuning frequency. In this case the C2SF (or another tuning frequency) is signaled and it is noted that this is a DSDS frequency, i.e. a special case in which the C2_tuning_frequency_type is set to "10".

Preferably, in an embodiment the delivery system descriptor includes at least the elements C2_tuning_frequency, plp_id and data_slice_id to enable the receiving apparatus to tune successfully. The C2_tuning_frequency is used to avoid scanning each time since dynamic or storing. The plp_id is used to specify a unique PLP. The data_slice_id could be inferred after parsing and processing all L1 signaling. However, this requires reasonable amount of software processing. Therefore a 2-step tuning process cannot be avoided if it is not signaled explicitly. The C2_system_id is not needed if the frequency is signaled, and since the plp_id is unique in a C2 system.

Figure 12:
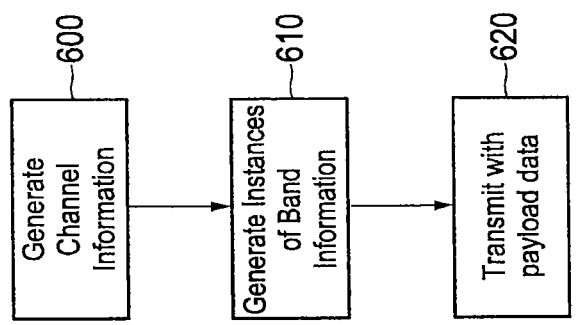
FIG. 12 schematically illustrates a transmission method.

FIG. 12 is a schematic flow chart showing the operation of a transmission apparatus. Steps 600 and 610 are (in this example) carried out by the controller 140, in which channel information (corresponding to the NIT data described above) and instances of band information (corresponding to the instances of the L1 data described above) are generated. Note that the generation of the NIT data is optional; the channels can be identified by a frequency sweep instead. At a step 620 these data are transmitted (a step carried out by the encoder and modulator 130).

In particular, the transmission method comprises the following steps. Step 600 is a step of modulating each of multiple data streams onto frequency subcarriers of a respective frequency band within one of a group of one or more frequency channels, the frequency bands each occupying no more than a predetermined maximum bandwidth less than or equal to the channel width. Step 610 is a step of generating band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel. Step 620 is a step of transmitting said data streams modulated onto frequency subcarriers and one or more instances of said band information at respective frequency positions within each frequency channel.

Figure 13:
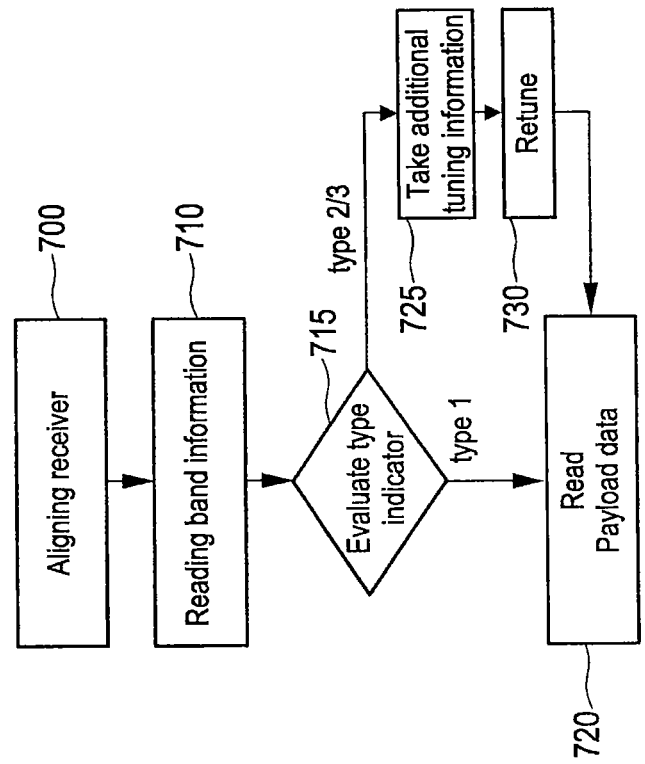
FIG. 13 schematically illustrates a first embodiment of a reception method.

FIG. 13 shows a flow chart of an embodiment of a receiving method according to the present disclosure comprising the following steps. Step 700 is a step of aligning the receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel. Step 710 is a step of reading said band information and retrieves the frequency band tuning frequency of a desired frequency band by evaluating said tuning frequency type indicator and the corresponding tuning frequency indicator.

Next, the tuning frequency type indicator is evaluated in step 715 to see if the tuning frequency type indicator indicates a first or second type (or even a third type, as used in some embodiments) of the tuning frequency. In case of the first type the receiver knows that it is tuned to a frequency band and that is already tuned to the correct frequency and can directly read (step 720) the payload data at the frequency band to which the receiver is tuned. In case of the second type the receiver knows that it is tuned to a center frequency of a frequency channel, but that additional tuning information for tuning is required which is then preferably taken in step 725 from L1 signaling data as described above. By use of this additional tuning information the receiver is retuned in step 730 whereafter the receiver reads (step 720) the payload data at the frequency band to which the receiver is now retuned. In case of the third type the receiver knows that it is shall be tuned to a static frequency band but first needs additional tuning information for tuning to said static frequency band, which is then preferably taken in step 725 from L1 signaling data as described above. By use of this additional tuning information the receiver is retuned in step 730 whereafter the receiver reads (step 720) the payload data at the frequency band to which the receiver is now retuned.

A second embodiment of the present disclosure shall now be explained in more detail. Also in this embodiment the band information is included in a delivery system descriptor, and also the general explanations provided above regarding the first embodiment apply. The delivery system descriptor for the second embodiment is shown below in table 5.

TABLE 5 delivery system descriptor

| Syntax | Number of bits | Identifier |
|---|---|---|
| C2_delivery_system_descriptor( ) { | | |
| descriptor_tag | 8 | uimsbf |
| descriptor_length | 8 | uimsbf |
| descriptor_tag_extension | 8 | uimsbf |
| plp_id | 8 | uimsbf |
| data_slice_id | 8 | uimsbf |
| C2_tuning_frequency | 32 | bslbf |
| C2_final_tuning_position | 1 | uimsbf |
| active_OFDM_symbol_duration | 3 | bslbf |
| guard_interval | 3 | bslbf |
| reserved | 1 | bslbf |
| } | | |

The semantics for this delivery system descriptor are also identical as explained above, but instead of the element C2_tuning_frequency_type the element C2_final_tuning_position (also called tuning frequency use flag) is used:

C2_final_tuning_position: This 1-bit flag that indicates whether the C2_tuning_frequency represents the final, Data Slice specific tuning position.

TABLE 6

C2_final_tuning_position

| C2_final_tuning_position | Description |
|---|---|
| 00 | Final C2 tuning frequency |
| 01 | Retuning required, based on L1 signaling information |

The 'Final C2 tuning frequency' is the default option for C2 systems. The C2_tuning_frequency field conveys the tuning frequency of the data slice to which plp_id refers. The C2_tuning_frequency for a particular Data Slice is the sum of the L1 signaling parameters START_FREQUENCY and the DSLICE_TUNE_POS. Note that the Data Slice tuning frequency information in the L1 signaling as well as in the C2 delivery system descriptor have to be updated synchronously.

The value of 'Retuning required, based on L1 signaling' information indicates that the C2 receiver needs to retune to its final tuning position, based on the Data Slice specific tuning information in the L1 signaling. 2 cases require this 2-step tuning approach.

In the first case C2_tuning_frequency represents the C2_system center frequency. This option is used by C2 headends that are not able to update the Data Slice tuning frequency information in the C2 delivery system descriptor and the L1 signaling in a synchronous way. The C2_tuning_frequency is the center frequency of the C2 system, and it is required that a complete Preamble can be received.

In the second case C2_tuning_frequency represents the initial tuning position for (Dependent) Static Data Slice: The Data Slice to be demodulated is a (Dependent) Static Data Slice (see the above cited DVB-C2 Implementation Guidelines, TS 102 991 section 10.2). In the case of tuning to a (Dependent) Static Data Slice, it cannot be guaranteed that the receiver is able to decode the L1 signaling at its final tuning position. Therefore the receiver must first tune to the signaled initial C2_tuning_frequency where a complete Preamble is transmitted. This frequency will usually be the C2_System center frequency, but can be any tuning position where the receiver can reliably decode the L1 signal. The receiver needs to evaluate the L1 signaling in the preamble in order to determine additional parameters (particularly notch positions) as well as the final tuning frequency of the (Dependent) Static Data Slice.

Generally, the layout of the transmission apparatus and the receiving apparatus using this second embodiment are rather similar to the layout of the transmission apparatus and the receiving apparatus using the first embodiment, i.e. generally the same main units are provided as shown in FIGS. 6 and 7.

The transmission apparatus 400 using this second embodiment thus comprises a modulator 410 that modulates each of multiple data streams onto frequency subcarriers of a respective frequency band within one of a group of one or more frequency channels, the frequency bands each occupying no more than a predetermined maximum bandwidth less than or equal to the channel width, a band information generator 420 that generates band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, and a transmitter 430 that transmits said data streams modulated onto frequency subcarriers, one or more instances of said band information at respective frequency positions within each frequency channel and said additional tuning information.

The receiving apparatus 500 using this second embodiment thus comprises a receiver 510 that aligns its receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, and a band information reader 520 that reads said band information and retrieves the frequency band tuning frequency of a desired frequency band by evaluating said tuning frequency use flag and the corresponding tuning frequency indicator and that reads further signaling data including additional tuning information in case the tuning frequency use flag is set to said second flag value, wherein said receiver 510 is configured to tune to the tuning frequency indicated by the read tuning frequency indicator of the desired frequency band if the tuning frequency use flag is set to said first flag value or use said additional tuning information for tuning if the tuning frequency use flag is set to said second flag value.

Figure 14:
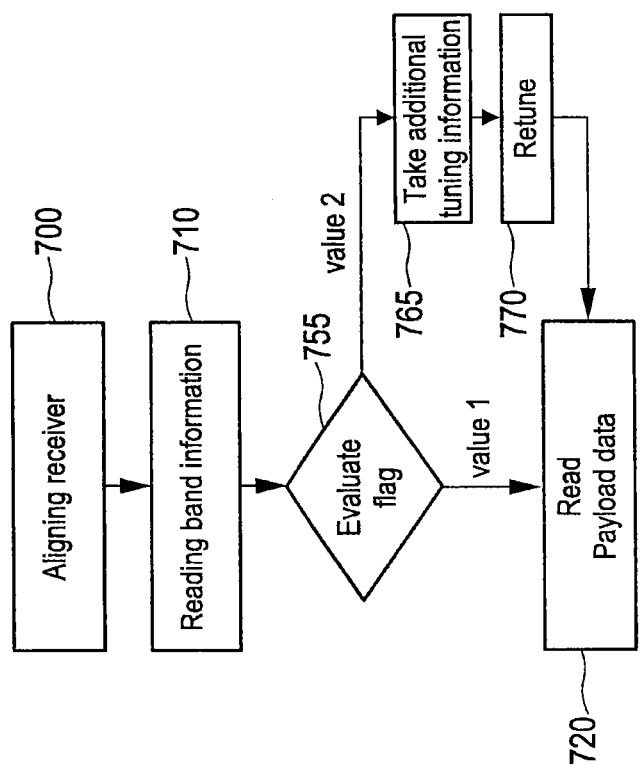
FIG. 14 schematically illustrates a second embodiment of a reception method.

A corresponding flow chart is shown in FIG. 14. Steps 700 and 710 are substantially identical to the steps a explained above for with reference to FIG. 13. In step 755 the tuning frequency use flag is evaluated. If the tuning frequency use flag is set to a first flag value (value 00 in table 6) the receiver is receiver is already tuned to the correct frequency and can directly read (step 720) the payload data at the frequency band to which the receiver is tuned. If the tuning frequency use flag is set to a second flag value (value 01 in table 6) additional tuning information is used in step 765 and then used for retuning to the correct tuning frequency in step 770 whereafter the receiver reads (step 720) the payload data at the frequency band to which the receiver is now retuned.

The present disclosure may be used to advantage in a VoD (Video on Demand) system. In a VoD system it is generally difficult and costly to scan (impossible in some cases as the streams are changing). The NIT information is not carried within the TS, but is signaled through a specific call, e.g. an internet (http://) call (for instance, through IP data separate and different from the audio and video data; in practice this would probably be through the same physical cable but conceivably even be via another wired or wireless connection). It is this specific case that signaling the DSTF makes the most sense in terms of saving time. For the general broadcast case the same information can be obtained by scanning the channel.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

The invention claimed is:

1. A transmission apparatus for transmitting signals in a multi carrier transmission system comprising:
    a modulator that modulates each of multiple data streams onto frequency subcarriers of a respective frequency band within one of a group of one or more frequency channels, the frequency bands each occupying no more than a predetermined maximum bandwidth less than or equal to the channel width,
    a band information generator that generates band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel, and
    a transmitter that transmits said data streams modulated onto frequency subcarriers and one or more instances of said band information at respective frequency positions within each frequency channel.

2. The transmission apparatus a claimed in claim 1, wherein said group of types indicated by said tuning frequency type indicator further comprises a third type indicating that additional tuning information is required to get the tuning position for a static frequency band.

3. The transmission apparatus as claimed in claim 1, wherein said band information generator is configured to generate band information further including a frequency band indicator indicating the frequency band to which said band information refers.

4. The transmission apparatus as claimed in claim 1, wherein said transmitter is configured to transmit said one or more instances of band information being arranged so that any portion of the frequency channel equal in extent to the predetermined maximum bandwidth includes at least one instance of the band information.

5. The transmission apparatus as claimed in claim 1, wherein said transmitter is configured to transmit each instance of the band information at periodic time intervals.

6. The transmission apparatus as claimed in any preceding claim,
    wherein the data carried by a channel are arranged as data frames, wherein said transmitter is configured to transmit each instance of the band information at least once in each data frame.

7. The transmission apparatus as claimed in claim 1, wherein said transmitter is configured to transmit said band information as part of a delivery descriptor, which is transmitted as part of a network information table included in each data stream.

8. The transmission apparatus as claimed in claim 1, wherein said transmitter is configured to transmit further signaling data including additional tuning information for use by a receiving apparatus in case the tuning frequency type indicator indicates a second type of the tuning frequency.

9. The transmission apparatus as claimed in claim 8, wherein said transmitter is configured to transmit said further signaling data as part of L1 signaling data included in a preamble of frames of a frame structure used for mapping said data streams onto said frequency channels.

10. The transmission apparatus as claimed in claim 1, wherein said transmitter is configured to transmit said band information via a separate wired or wireless communication channel, in particular via an electrical and/or optical cable channel.

11. A transmission apparatus for transmitting signals in a multi carrier transmission system comprising:
   a modulator that modulates each of multiple data streams onto frequency subcarriers of a respective frequency band within one of a group of one or more frequency channels, the frequency bands each occupying no more than a predetermined maximum bandwidth less than or equal to the channel width,
   a band information generator that generates band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, and
   a transmitter that transmits said data streams modulated onto frequency subcarriers, one or more instances of said band information at respective frequency positions within each frequency channel and said additional tuning information.

12. A transmission method for transmitting signals in a multi carrier transmission system comprising the steps of:
   modulating each of multiple data streams onto frequency subcarriers of a respective frequency band within one of a group of one or more frequency channels, the frequency bands each occupying no more than a predetermined maximum bandwidth less than or equal to the channel width,
   generating band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel, and
   transmitting said data streams modulated onto frequency subcarriers and one or more instances of said band information at respective frequency positions within each frequency channel.

13. A transmission method for transmitting signals in a multi carrier transmission system comprising the steps of:
   modulating each of multiple data streams onto frequency subcarriers of a respective frequency band within one of a group of one or more frequency channels, the frequency bands each occupying no more than a predetermined maximum bandwidth less than or equal to the channel width,
   generating band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, and
   transmitting said data streams modulated onto frequency subcarriers, one or more instances of said band information at respective frequency positions within each frequency channel and said additional tuning information.

14. A receiving apparatus for receiving signals in a multi carrier transmission system, wherein each of multiple data streams are modulated onto frequency subcarriers of a respective frequency band within one of a group of one or more frequency channels, the frequency bands each occupying no more than a predetermined maximum bandwidth less than or equal to the channel width, said receiving apparatus comprising:
   a receiver that aligns its receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel, and
   a band information reader that reads said band information and retrieves the frequency band tuning frequency of a desired frequency band by evaluating said tuning frequency type indicator and the corresponding tuning frequency indicator,
   wherein said receiver is configured to tune to the tuning frequency indicated by the read tuning frequency indicator if the tuning frequency type indicator indicates a first type of the tuning frequency or to use additional tuning information for tuning if the tuning frequency type indicator indicates a second type of the tuning frequency.

15. The receiving apparatus as claimed in claim 14, wherein said group of types indicated by said tuning frequency type indicator further comprises a third type indicating that additional tuning information is required to get the tuning position for a static frequency band,
   wherein said band information reader is configured to retrieve said additional information for said static frequency band, and
   wherein said receiver is configured to tune to said tuning position of said static frequency band.

16. The receiving apparatus as claimed in claim 14, wherein said band information reader is configured to read further signaling data including additional tuning information in case the tuning frequency type indicator indicates a second type of the tuning frequency, and
   wherein said receiver is configured to use said additional tuning information together with said tuning frequency indicated by the read tuning frequency indicator for tuning.

17. A receiving apparatus for receiving signals in a multi carrier transmission system, wherein each of multiple data streams are modulated onto frequency subcarriers of a respective frequency band within one of a group of one or more frequency channels, the frequency bands each occupying no more than a predetermined maximum bandwidth less than or equal to the channel width, said receiving apparatus comprising:

a receiver that aligns its receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, and a band information reader that reads said band information and retrieves the frequency band tuning frequency of a desired frequency band by evaluating said tuning frequency use flag and the corresponding tuning frequency indicator and that reads further signaling data including additional tuning information in case the tuning frequency use flag is set to said second flag value, wherein said receiver is configured to tune to the tuning frequency indicated by the read tuning frequency indicator of the desired frequency band if the tuning frequency use flag is set to said first flag value or use said additional tuning information for tuning if the tuning frequency use flag is set to said second flag value.

18. A receiving method for receiving signals in a multi carrier transmission system, wherein each of multiple data streams are modulated onto frequency subcarriers of a respective frequency band within one of a group of one or more frequency channels, the frequency bands each occupying no more than a predetermined maximum bandwidth less than or equal to the channel width, said receiving method comprising the steps of:

aligning the receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency type indicator indicating the type of tuning frequency indicated by said tuning frequency indicator, wherein said type is selected from a group comprising at least a first type indicating a tuning frequency of a frequency band and a second type indicating a center frequency of a frequency channel, reading said band information and retrieves the frequency band tuning frequency of a desired frequency band by evaluating said tuning frequency type indicator and the corresponding tuning frequency indicator, and tuning to the tuning frequency indicated by the read tuning frequency indicator if the tuning frequency type indicator indicates a first type of the tuning frequency or to use additional tuning information for tuning if the tuning frequency type indicator indicates a second type of the tuning frequency.

19. A receiving method, for receiving signals in a multi carrier transmission system, wherein each of multiple data streams are modulated onto frequency subcarriers of a respective frequency band within one of a group of one or more frequency channels, the frequency bands each occupying no more than a predetermined maximum bandwidth less than or equal to the channel width, said receiving method comprising the steps of:

aligning the receiver bandwidth with a frequency channel so as to receive, from within that frequency channel, an instance of a band information, said band information defining the frequency bands corresponding to all of the data streams carried within that frequency channel, said band information including a tuning frequency indicator indicating a tuning frequency and a tuning frequency use flag having a first flag value indicating that the tuning frequency indicated by said tuning frequency indicator can be used directly by a receiving apparatus for tuning or having a second flag value indicating that additional tuning information is to be used by a receiving apparatus for tuning, reading said band information and retrieves the frequency band tuning frequency of a desired frequency band by evaluating said tuning frequency use flag and the corresponding tuning frequency indicator and that reads further signaling data including additional tuning information in case the tuning frequency use flag is set to said second flag value, and tuning to the tuning frequency indicated by the read tuning frequency indicator of the desired frequency band if the tuning frequency use flag is set to said first flag value or use said additional tuning information for tuning if the tuning frequency use flag is set to said second flag value.

20. A computer readable non-transitory medium having instructions stored thereon which, when carried out on a computer, cause the computer to perform the steps of the method as claimed in claim 12, 13, 18 or 19.

\* \* \* \* \*